(12) United States Patent
Geetha et al.

(10) Patent No.: US 10,007,606 B2
(45) Date of Patent: Jun. 26, 2018

(54) IMPLEMENTATION OF RESERVED CACHE SLOTS IN COMPUTING SYSTEM HAVING INCLUSIVE/NON INCLUSIVE TRACKING AND TWO LEVEL SYSTEM MEMORY

(71) Applicant: Intel Corporation, Santa Clara, CA (US)

(72) Inventors: Vedaraman Geetha, Fremont, CA (US); Brian S. Morris, Santa Clara, CA (US); Binata Bhattacharyya, Bangalore (IN); Massimo Sutera, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 10 days.

(21) Appl. No.: 15/085,599

(22) Filed: Mar. 30, 2016

(65) Prior Publication Data

US 2017/0286298 A1 Oct. 5, 2017

(51) Int. Cl.
*G06F 12/08* (2016.01)
*G06F 12/0831* (2016.01)
*G06F 12/0811* (2016.01)

(52) U.S. Cl.
CPC ...... *G06F 12/0831* (2013.01); *G06F 12/0811* (2013.01); *G06F 2212/283* (2013.01); *G06F 2212/621* (2013.01)

(58) Field of Classification Search
CPC .......... G06F 12/0811; G06F 2212/621; G06F 12/0815; G06F 12/0842
See application file for complete search history.

(56) References Cited

U.S. PATENT DOCUMENTS

| | | | |
|---|---|---|---|
| 5,912,839 A | 6/1999 | Ovshinsky et al. | |
| 6,035,432 A | 3/2000 | Jeddeloh | |

(Continued)

FOREIGN PATENT DOCUMENTS

| | | |
|---|---|---|
| CN | 1100540 A | 3/1995 |
| CN | 101079003 A | 11/2007 |

(Continued)

OTHER PUBLICATIONS

Akel et al., "Onyx: A Prototype Phase Change Memory Storage Array",www.flashmemorysummit.com/ .. ./Proceeding_2011/08/11_S301_Akel.pdf, 5 pgs.

Bailey et al., "Operating System Implications of Fast, Cheap, Non-Volatile Memory" 13th USENIX, HOTOS11 2011, May 9-11, 2011, 5 pages.

(Continued)

*Primary Examiner* — Hashem Farrokh
(74) *Attorney, Agent, or Firm* — Compass IP Law PC

(57) ABSTRACT

Electronic circuitry of a computing system is described where the computing system includes a multi-level system memory where the multi-level system memory includes a near memory cache. The computing system directs system memory access requests whose addresses map to a same near memory cache slot to a same home caching agent so that the same home caching agent can characterize individual cache lines as inclusive or non-inclusive before forwarding the requests to a system memory controller, and where the computing system directs other system memory access requests to the system memory controller without passing the other requests through a home caching agent. The electronic circuitry is to modify the respective original addresses of the other requests to include a special code that causes the other system memory access requests to map to a specific pre-determined set of slots within the near memory cache.

21 Claims, 9 Drawing Sheets

(56) References Cited

U.S. PATENT DOCUMENTS

| | | |
|---|---|---|
| 6,292,874 B1 | 9/2001 | Barnett |
| 7,590,918 B2 | 9/2009 | Parkinson |
| 7,600,078 B1 | 10/2009 | Cen et al. |
| 7,606,994 B1 | 10/2009 | Cypher |
| 7,756,053 B2 | 7/2010 | Thomas et al. |
| 7,913,147 B2 | 3/2011 | Swaminathan et al. |
| 8,051,253 B2 | 11/2011 | Okin et al. |
| 8,462,537 B2 | 6/2013 | Karpov et al. |
| 8,462,577 B2 | 6/2013 | Zeng et al. |
| 8,463,948 B1 | 6/2013 | Qawami et al. |
| 8,605,531 B2 | 12/2013 | Kau |
| 8,607,089 B2 | 12/2013 | Qawami et al. |
| 8,612,676 B2 | 12/2013 | Dahlen et al. |
| 8,612,809 B2 | 12/2013 | Casper et al. |
| 8,626,997 B2 | 1/2014 | Qawami et al. |
| 8,649,212 B2 | 2/2014 | Kau et al. |
| 8,838,935 B2 | 9/2014 | Hinton et al. |
| 9,342,453 B2 | 5/2016 | Nale et al. |
| 9,378,133 B2 | 6/2016 | Nachimuthu et al. |
| 9,430,372 B2 | 8/2016 | Nachimuthu et al. |
| 2004/0003174 A1* | 1/2004 | Yamazaki ............ G06F 9/30043 711/118 |
| 2007/0005922 A1 | 1/2007 | Swaminathan et al. |
| 2008/0016269 A1 | 1/2008 | Chow et al. |
| 2008/0034148 A1 | 2/2008 | Gower et al. |
| 2008/0082766 A1 | 4/2008 | Okin et al. |
| 2008/0270811 A1 | 10/2008 | Chow et al. |
| 2009/0119498 A1 | 5/2009 | Narayanan |
| 2009/0313416 A1 | 12/2009 | Nation |
| 2010/0110748 A1 | 5/2010 | Best |
| 2010/0131827 A1 | 5/2010 | Sokolov et al. |
| 2010/0291867 A1 | 11/2010 | Abdulla et al. |
| 2010/0293317 A1 | 11/2010 | Confalonieri et al. |
| 2010/0306446 A1 | 12/2010 | Villa et al. |
| 2010/0306453 A1 | 12/2010 | Doller |
| 2010/0318718 A1 | 12/2010 | Eilert et al. |
| 2010/0332762 A1 | 12/2010 | Moga et al. |
| 2011/0047365 A1 | 2/2011 | Hentosh et al. |
| 2011/0153916 A1 | 6/2011 | Chinnaswamy et al. |
| 2011/0208900 A1 | 8/2011 | Schuette et al. |
| 2011/0291884 A1 | 12/2011 | Oh et al. |
| 2013/0042070 A1* | 2/2013 | Jalal ............... G06F 12/084 711/130 |
| 2013/0275661 A1 | 10/2013 | Zimmer et al. |
| 2013/0282967 A1 | 10/2013 | Ramanujan |
| 2013/0290597 A1 | 10/2013 | Faber |
| 2014/0040550 A1 | 2/2014 | Nale et al. |
| 2014/0129767 A1 | 5/2014 | Ramanujan et al. |
| 2014/0297938 A1 | 10/2014 | Puthiyedath et al. |
| 2014/0325160 A1 | 10/2014 | Lim et al. |
| 2015/0186275 A1* | 7/2015 | Moga ............... G06F 12/0811 711/122 |

FOREIGN PATENT DOCUMENTS

| | | |
|---|---|---|
| CN | 101620539 A | 1/2010 |
| WO | 2005002060 A2 | 1/2005 |

OTHER PUBLICATIONS

Caulfield et al., "Moneta: A High-performance Storage Array Architecture for Next-generation, Non-volatile Memories", Micro 43: Proceedings of the 43rd Annual IEEE/ACM International Symposium on Microarchitecture, Atlanta, GA Dec. 2010 pp. 385-395.

Chen et al., "Rethinking Database Algorithms for Phase Change Memory", 5th Biennial Conference on Innovative Data Systems Research {CIDR '11 }, Jan. 9, 2011, 11 pgs., Asilomar, California, USA.

Condit et al., "Better I/0 Through Byte-Addressable, Persistent Memory", SOSP '09, Oct. 11, 2009, pp. 133-146. Big Sky, Montana, USA.

Dhiman, et al. "PDRAM: A Hybrid PRAM and DRAM Main Memory System", Jul. 26, 2009, Department of Computer Science and Engineering, 6 pages.

Freitas et al., "Storage-class memory: The next storage system technology", IBM J. RES. & DEV., Jul./Sep. 2008, pp. 439-447, vol. 52, No. 4/5.

International Search Report and Written Opinion for PCT Patent Application No. PCT/US2017/016536, dated May 18, 2017, 10 pages.

Jacob et al., "The Memory System You Can't Avoid It, You Can't Ignore It, You Can't Fake It", 2009, 77 pgs., Morgan & Claypool.

Kant, Dr. Krishna, "Exploiting NVRAM for Building Multi-Level Memory Systems", InternationalWorkshop on Operating System Technologies for Large Scale NVRAM, Oct. 21, 2008, Jeju, Korea, 19 pages.

Lee et al., "Architecting Phase Change Memory as a Scalable DRAM Alternative", ISCA '09, Jun. 20, 2009, 12 pgs., Austin, Texas, USA.

Mearian, "IBM announces computer memory breakthrough Phase-change memory offers 100 times the write performance of NANO flash", Jun. 30, 2011, 3 pgs.

Mogul et al., "Operating System Support for NVM+DRAM Hybrid Main Memory", 12th Workshop on Hot Topics in Operating Systems (HatOS XII), May 18, 2009, 9 pgs.

Phase Change Memory-Based 'Moneta' System Points to the Future of Computer Storage, ScienceBlog, Jun. 3, 2011, 7 pgs.,.

Quereshi et al., "Scalable High Performance Main Memory System Using Phase-Change Memory Technology", ISCA '09, Jun. 20, 2009, 10 pgs., Austin, Texas, USA.

Raoux et al., "Phase-change random access memory: A scalable technology", IBM J. Res. & Dev., Jul./ Sep. 2008, pp. 465-479, vol. 52, No. 4/5.

The Non-Volatile Systems Laboratory Coding for non-volatile memories, http://nvsl.ucsd.edu/ecc, printed Sep. 1, 2011. 2 pgs.

The Non-Volatile Systems Laboratory Moneta and Onyx: Very Fast SS, http://nvsl.ucsd.edu/monela/, 3 pgs., Sep. 1, 2011.

The Non-Volatile Systems Laboratory NV-Heaps: Fast and Safe Persistent Objects, http://nvsl.ucsd.edu/nvuheaps/, 2 pages, Sep. 1, 2011.

Wu, et al., "eNVy: A Non-Volatile, Main Memory Storage System" 1994 ACM., ASPLOS VI. pp. 86-97.

\* cited by examiner

US 10,007,606 B2

IMPLEMENTATION OF RESERVED CACHE SLOTS IN COMPUTING SYSTEM HAVING INCLUSIVE/NON INCLUSIVE TRACKING AND TWO LEVEL SYSTEM MEMORY

FIELD OF INVENTION

The field of invention pertains to computing systems generally, and, more specifically, to implementation of reserved cache slots in a computing system having inclusive/non inclusive tracking and a two level system memory.

BACKGROUND

Computing systems typically include a system memory (or main memory) that contains data and program code of the software code that the system's processor(s) are currently executing. A pertinent issue in many computer systems is the system memory. Here, as is understood in the art, a computing system operates by executing program code stored in system memory. The program code, when executed, reads and writes data from/to system memory. As such, system memory is heavily utilized with many program code and data reads as well as many data writes over the course of the computing system's operation. Finding ways to improve system memory is therefore a motivation of computing system engineers.

BRIEF DESCRIPTION OF THE DRAWINGS

The present invention is illustrated by way of example and not limitation in the figures of the accompanying drawings, in which like references indicate similar elements and in which.

DETAILED DESCRIPTION 1.0 Computing System Having Multi-Level System Memory

Figure 1:
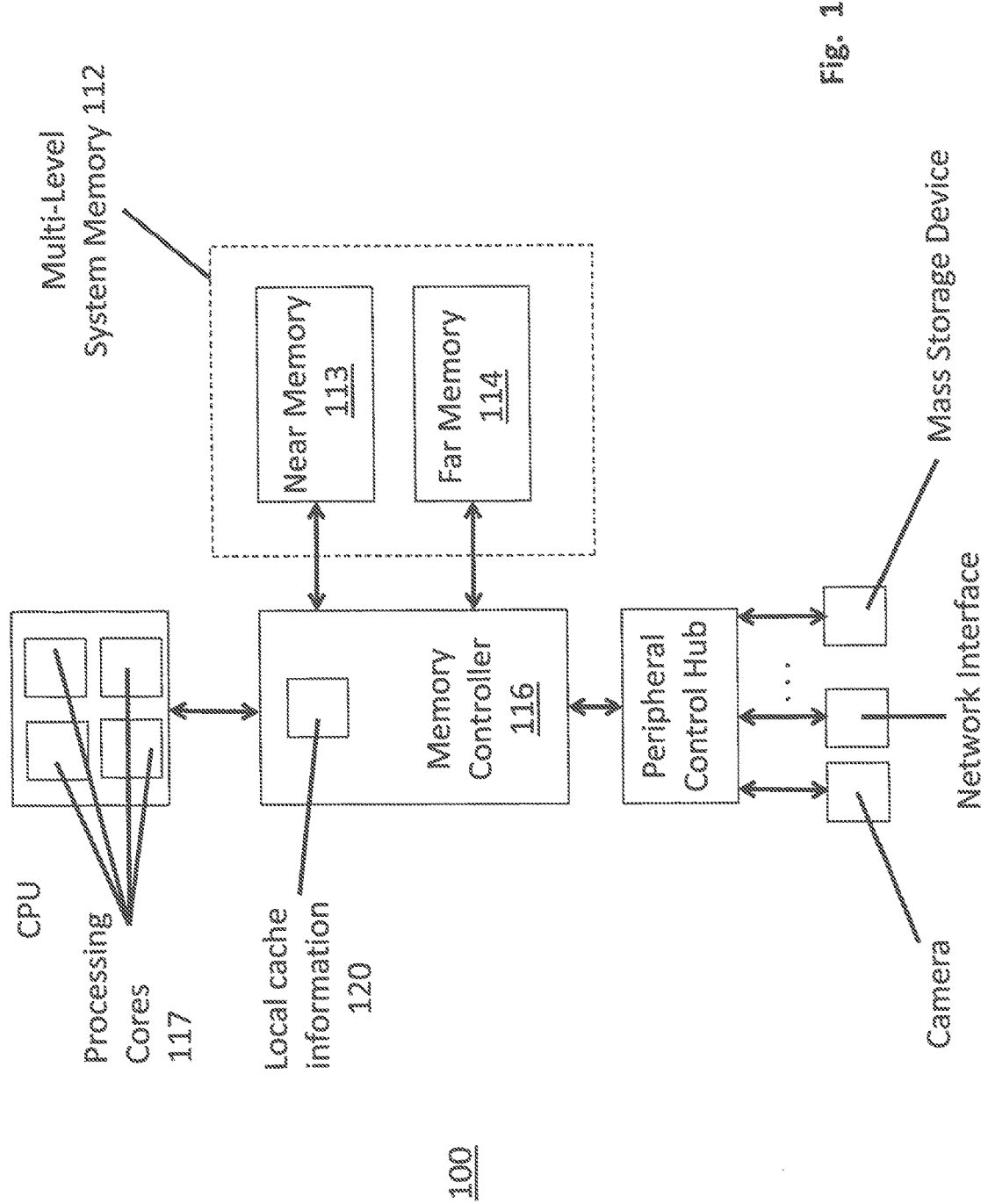
FIG. 1 (prior art) shows a two level system memory.

One of the ways to improve system memory performance is to have a multi-level system memory. FIG. 1 shows an embodiment of a computing system 100 having a multi-tiered or multi-level system memory 112. According to various embodiments, a smaller, faster near memory 113 may be utilized as a cache for a larger far memory 114.

In the case where near memory 113 is used as a cache, near memory 113 is used to store an additional copy of those data items in far memory 114 that are expected to be more frequently called upon by the computing system. The near memory cache 113 has lower access times than the lower tiered far memory 114 region. By storing the more frequently called upon items in near memory 113, the system memory 112 will be observed as faster because the system will often read items that are being stored in faster near memory 113. For an implementation using a write-back technique, the copy of data items in near memory 113 may contain data that has been updated by the CPU, and is thus more up-to-date than the data in far memory 114. The process of writing back 'dirty' cache entries to far memory 114 ensures that such changes are not lost.

According to some embodiments, for example, the near memory 113 exhibits reduced access times by having a faster clock speed than the far memory 114. Here, the near memory 113 may be a faster, volatile system memory technology (e.g., high performance dynamic random access memory (DRAM)) and/or SRAM memory cells co-located with the memory controller 116. By contrast, far memory 114 may be either a volatile memory technology implemented with a slower clock speed (e.g., a DRAM component that receives a slower clock) or, e.g., a non volatile memory technology that may be slower than volatile/DRAM memory or whatever technology is used for near memory.

For example, far memory 114 may be comprised of an emerging non volatile random access memory technology such as, to name a few possibilities, a phase change based memory, three dimensional crosspoint memory device, or other byte addressable nonvolatile memory devices, memory devices that use chalcogenide phase change material (e.g., glass), single or multiple level NAND flash memory, multi-threshold level NAND flash memory, NOR flash memory, a ferro-electric based memory (e.g., FRAM), a magnetic based memory (e.g., MRAM), a spin transfer torque based memory (e.g., STT-RAM), a resistor based memory (e.g., ReRAM), a Memristor based memory, universal memory, Ge2Sb2Te5 memory, programmable metallization cell memory, amorphous cell memory, Ovshinsky memory, etc.

Such emerging non volatile random access memory technologies typically have some combination of the following: 1) higher storage densities than DRAM (e.g., by being constructed in three-dimensional (3D) circuit structures (e.g., a crosspoint 3D circuit structure)); 2) lower power consumption densities than DRAM (e.g., because they do not need refreshing); and/or, 3) access latency that is slower than DRAM yet still faster than traditional non-volatile memory technologies such as FLASH. The latter characteristic in particular permits various emerging non volatile memory technologies to be used in a main system memory role rather than a traditional mass storage role (which is the traditional architectural location of non volatile storage).

Regardless of whether far memory 114 is composed of a volatile or non volatile memory technology, in various embodiments far memory 114 acts as a true system memory in that it supports finer grained data accesses (e.g., cache lines) rather than larger sector based accesses associated with traditional, non volatile mass storage (e.g., solid state drive (SSD), hard disk drive (HDD)), and/or, otherwise acts as an (e.g., byte) addressable memory that the program code being executed by processor(s) of the CPU operate out of. However, far memory 114 may be inefficient when accessed for a small number of consecutive bytes (e.g., less than 128 bytes) of data, the effect of which may be mitigated by the presence of near memory 113 operating as cache which is able to efficiently handle such requests.

Because near memory 113 acts as a cache, near memory 113 may not have formal addressing space. Rather, in some cases, far memory 114 defines the individually addressable memory space of the computing system's main memory. In various embodiments near memory 113 acts as a cache for far memory 114 rather than acting a last level CPU cache. Generally, a CPU cache is optimized for servicing CPU transactions, and will add significant penalties (such as cache snoop overhead and cache eviction flows in the case of hit) to other memory users such as DMA-capable devices in a Peripheral Control Hub. By contrast, a memory side cache is designed to handle all accesses directed to system memory, irrespective of whether they arrive from the CPU, from the Peripheral Control Hub, or from some other device such as display controller.

For example, in various embodiments, system memory is implemented with dual in-line memory module (DIMM) cards where a single DIMM card has both DRAM and (e.g., emerging) non volatile memory chips disposed in it. The DRAM chips effectively act as an on board cache for the non volatile memory chips on the DIMM card. Ideally, the more frequently accessed cache lines of any particular DIMM card will be accessed from that DIMM card's DRAM chips rather than its non volatile memory chips. Given that multiple DIMM cards may be plugged into a working computing system and each DIMM card is only given a section of the system memory addresses made available to the processing cores 117 of the semiconductor chip that the DIMM cards are coupled to, the DRAM chips are acting as a cache for the non volatile memory that they share a DIMM card with rather than a last level CPU cache.

In other configurations DIMM cards having only DRAM chips may be plugged into a same system memory channel (e.g., a DDR channel) with DIMM cards having only non volatile system memory chips. Ideally, the more frequently used cache lines of the channel will be found in the DRAM DIMM cards rather than the non volatile memory DIMM cards. Thus, again, because there are typically multiple memory channels coupled to a same semiconductor chip having multiple processing cores, the DRAM chips are acting as a cache for the non volatile memory chips that they share a same channel with rather than as a last level CPU cache.

In yet other possible configurations or implementations, a DRAM device on a DIMM card can act as a memory side cache for a non volatile memory chip that resides on a different DIMM and is plugged into a different channel than the DIMM having the DRAM device. Although the DRAM device may potentially service the entire system memory address space, entries into the DRAM device are based in part from reads performed on the non volatile memory devices and not just evictions from the last level CPU cache. As such the DRAM device can still be characterized as a memory side cache.

In another possibly configuration, a memory device such as a DRAM device functioning as near memory 113 may be assembled together with the memory controller 116 and processing cores 117 onto a single semiconductor device or within a same semiconductor package. Far memory 114 may be formed by other devices, such as slower DRAM or non-volatile memory and may be attached to, or integrated in that device.

Figure 2:
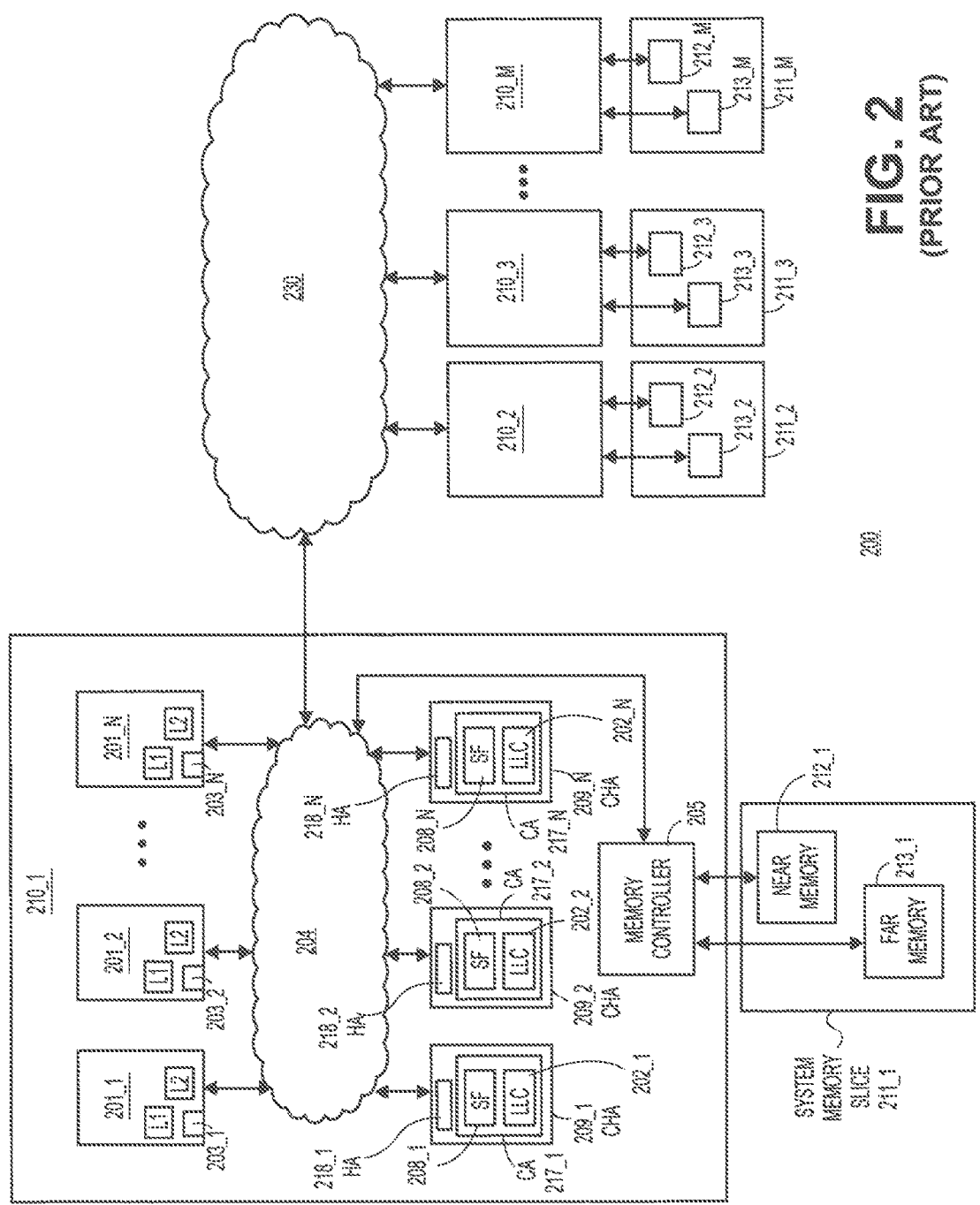
FIG. 2 (prior art) shows a computing system implemented with multi-core processors and a two level system memory.

FIG. 2 shows a multicore processor 210_1 that is part of a larger multiprocessor computing system 200. As observed in FIG. 2, the multicore processor 210_1 includes a plurality of processing cores 201_1 through 201_N interconnected to a set of distributed cache home agents (CHAs) 209_1 through 209_N. As observed in FIG. 2, each CHA instance 209_1 through 209_N is composed of a slice of last level cache (LLC) instance 202_1 through 202_N and snoop filters 208_1 through 208_N. The LLC instances 202 and snoop filter instances 208 are components of respective caching agents (CA) 217_1 through 217_N. Each of the caching agents 217_1 through 217_N is integrated with a respective home agent (HA) 218_1 through 218_N to form a respective CHA 209_1 through 209_N. The CA is responsible for local coherence and the CPU side cache interface, and the HA is responsible for global coherence and the system memory interface.

Each LLC instance 202_1 through 202_N is responsible for acting as a last level cache of the processor 200 for a "slice" of system memory addresses (for simplicity the number of CHA and LLC slices is depicted as being the same as the number of cores but alternative designs may have them unequal). Which particular system memory addresses map to which LLC instance is determined by a hashing function 203_1 through 203_N within each processing core 201_1 through 201_N. In operation when a processing core needs to evict a cache line from its own internal L2 cache or read a cache line that is not found in its L2 cache, the processing core hashes the address of the desired cache line. The output of the hashing function identifies which LLC the cache line request is to be directed to. The processing core then directs the cache line request to the correct CHA via interconnection network 204.

The respective snoop filters 208_1 through 208_N of the distributed CHA track the MESI states of the cache lines having system memory addresses that hash to its resident CHA and are cached in an L1 or L2 cache. For example, snoop filter 208_1 keeps a table that tracks the MESI states of the cache lines that are cached in any L1 or L2 caches of the above processing cores 201_1 through 201_N but that would hash to CHA 209_1 if evicted. Thus the collection of snoop filters 208_1 through 208_N are able to track the MESI states of all the cache lines in the L1 and L2 caches of the above processing cores 201_1 through 201_N.

As the overall computing system 200 contains multiple multicore processors 210_1 through 210_M, each multicore processor has its own associated system memory component 211_1 through 211_M. Like the last level caching approach, each system memory component 211_1 through 211_M is responsible for its own "slice" of system memory addresses. For example, when a cache line is evicted from an LLC instance, the "caching agent" function associated with the LLC instance's CHA determines which system memory slice the cache line should be directed to. Similarly, when a core issues a read that is not found in the snoop filter or LLC of the CHA targeted by the read, the CA associated with the CHA targeted by the read will determine which system memory slice the cache line should be directed to.

For any cache line accessed by processor 210_1, if the cache line is to be directed to the "local" system memory component 211_1, the cache line is directed to the local memory controller 205 through the "home agent" functionality of the CHA. If the cache line is to be directed to a remote system memory component 211_2 through 211_M, the cache line is directed to a remote processor. For example, if a cache line that is evicted from LLC instance 202_1 is be stored in the local system memory component 211_1, the cache line is sent through the internal interconnection network 204 to memory controller 205. By contrast, if the cache line is to be directed to one of the remote system memory components 211_2 through 211_M, the cache line is directed to one of the remote processors 210_2 through 210_M through the internal interconnection network 204 to the external interconnect network 230 for storage in the remote processor's local system memory component.

As observed in FIG. 2, the system memory components 211_1 through 211_M each include a respective near memory component 212_1 through 212_M and a respective far memory component 213_1 through 213_M. Each near memory component 212_1 through 212_M acts as a local cache for its respective far memory component 213_1 through 213_M. In an implementation, the near memory 212_1 is a direct mapped cache. In the case of a direct mapped cache, a set of addresses map to a single entry in near memory (the location being determinable from the addresses themselves). Thus, in a sense, more than one system memory address will "fight" for use of a same near memory entry.

In operation, for any read or write request, the memory controller 205 will perform a read into near memory to see if the cache line to which the request pertains is cached there. If so (near memory cache hit), the memory controller 205 performs the requested operation and keeps the cache line in near memory 212_1. In the case of a read, a copy of the requested cache line is sent to the requestor and the cache line is not written over in near memory (i.e., is kept there). In the case of a write the new data for the cache line that was received in the request is written over the old cache line in near memory.

If the requested cache line is not found in near memory (near memory cache miss), in the case of a read, the controller 205 reads the cache line from far memory 213_1, sends a copy of the cache line to the requestor and writes the cache line into near memory 212_1. In the case of a write when the requested cache line is not found in near memory 212_1, the controller 205 simply writes the cache line that was received with the request into far memory 213_1. No copy is placed in near memory 212_1. Thus, if there is no "hit" in near memory, a read will evict the cache line in near memory but a write will not evict the cache line in near memory.

2.0 Inclusive/Non-Inclusive Tracking

When it is possible that a copy of a writable cache line (e.g., a cache line in the M or E state) within one of the caches of the system 200 might not exist in the near memory of its system memory slice, the system is said to be operating in a "non inclusive" mode. Here, "non inclusive" mode requires a read into near memory for any write operation to system memory, even for cache lines in the M or E state in a processor cache, because it is not known whether or not a copy of the cache line resides in near memory. This lack of knowledge reproduces as system inefficiency.

Another mode of operation, referred to as "inclusive" guarantees that a writable cache line in any processor caching level will be kept in near memory 212_1. This means, for instance, if an M or E cache line is cached within a processor, a copy or older version of the cache line for the same system memory address is also kept in near memory 212_1. For simplicity the remainder of the document will refer mainly to copies. Thus if an M/E cache line in a processor cache is written back, the written back cache line is directly written into near memory 212_1 by controller 205. No read of near memory 212_1 needs to be performed beforehand.

Cache lines can and will be evicted from near memory 212_1, however. For example, if a read request is received by controller 205 for a cache line having a different system memory address than the address of a cache line in near memory having a sibling in an M/E state in a system level cache but that still maps to the same location in near memory 212_1, a near memory cache miss will result. The cache line in near memory 212_1 will be evicted from near memory 212_1 and written further back to far memory 213_1 if the line is modified in NM. The requested cache line will be read from far memory 213_1 and forwarded to the requestor. The requested cache line will also be written into near memory 212_1 as discussed above (as discussed above, a read on a near memory miss will evict the near memory cache line).

Thus the problem exists that a cache line in near memory 212_1 having a sibling cache line in the M or E state in a system level cache can be evicted from near memory 212_1 in violation of the "inclusive" guarantee that any such cache line has a copy of itself in near memory 212_1. In order to handle this problem, the controller 205 and the processors 210_1 through 210_M are designed to "back-invalidate" any such sibling cache line in a system level cache from its M or E state to an S state. Thus, for example, if a cache line in the M or E state is cached in a system cache and its version in near memory 212_1 is evicted, the state of the cache line in the system cache is changed (e.g., at its associated snoop filter) from M or E to S. The S state is a non-writable state. Thus, with the cache line in the system cache having been changed to the S state, there is no longer any need to guarantee that it has a copy in near memory. Thus the eviction of the cache line's copy from near memory 212_1 no longer violates the inclusive mode guarantee. Here, the back invalidation process must be confirmed as complete before controller 205 is free to evict the cache line from near memory 212_1.

The back invalidation process itself, however, is inefficient because it necessitates traffic from/to controller 205 to/from the processor where the cache line in the M or E state resides. It also requires any modified lines in system cache to be written back to memory before being changed to the S state. It does not allow further modification to the cache line without requesting exclusive access to the cache line which usually requires a request to the memory controller. In multi-processor systems, it may also require traffic on the external interconnect which is even more expensive and deadlock prone.

Figure 3:
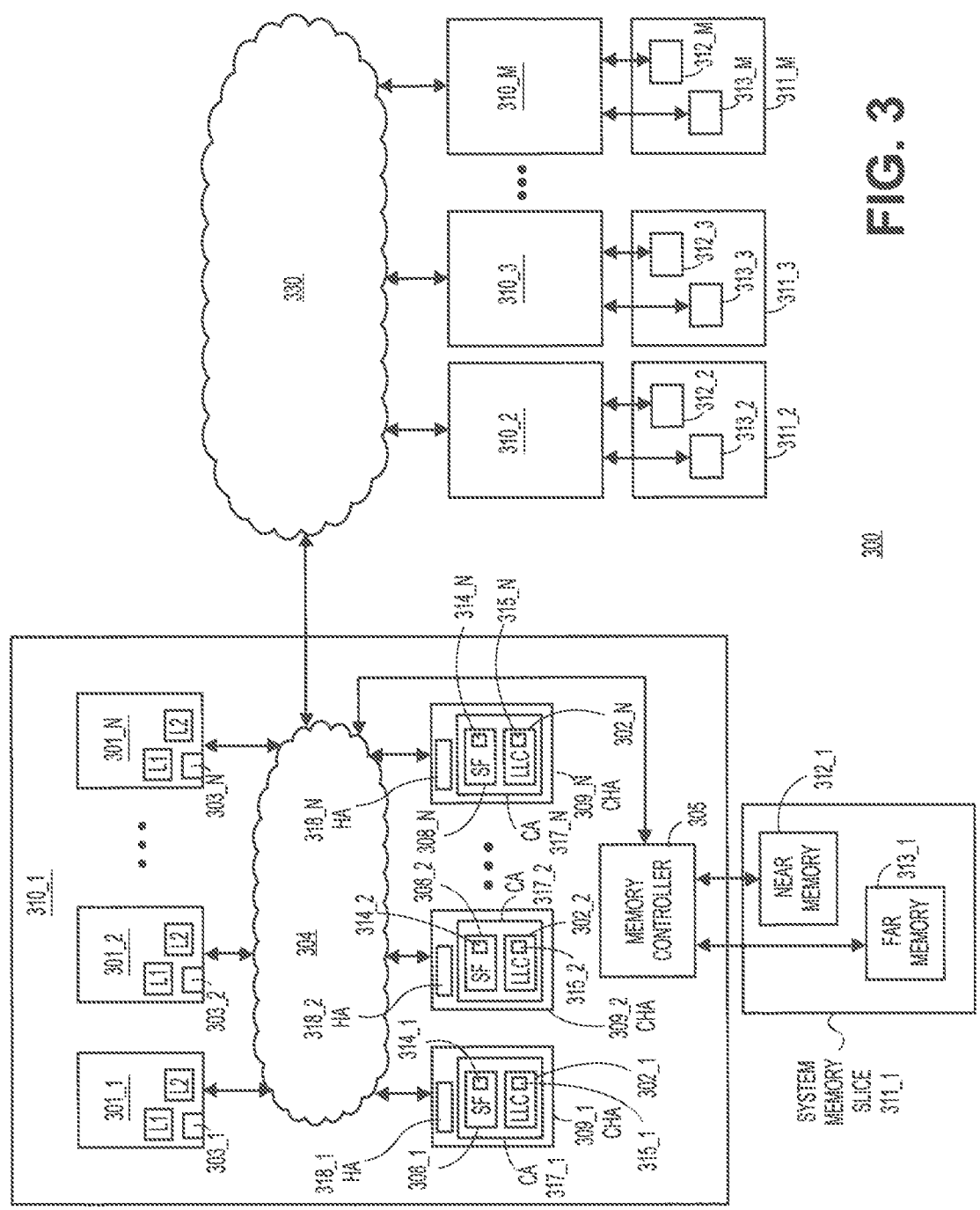
FIG. 3 shows an improved computing system implemented with multi-core processors and a two level system memory.

FIG. 3 therefore pertains to another approach that does not require back invalidation and maintains an inclusive mode at least for system memory addresses that map to a local system memory slice (i.e., can maintain a "local inclusive" state) for lines accessed by local cores. The approach of FIG. 3 essentially designs into the CHA instances 309_1 through 309_M a full view perspective, at least for local memory accesses, of the happenings between controller 305 and near memory 312_1.

With the CHA instances 309_1 through 309_M having a full view of the happenings before their local near memory 312_1, the CHA instances 309_1 through 309_M can detect when a cache line in the M/E state that is cached within the processor 310_1 has its copy in near memory evicted (e.g., by a read of a cache line having a different system memory address that maps to the same entry in near memory where the copy is kept) and thereby removing any "inclusive" property of the near memory for that cache line. With knowledge as to whether near memory 312_1 is behaving "non-inclusively" or "inclusively" for its own cache lines, the CHA instances 309_1 through 309_M can indicate to controller 305, as part of any write requests issued to controller 305, whether the controller 305 needs to perform a read of near memory 312_1 or does not need to perform a read of near memory 312_1 before writing the cache line into system memory 311_1.

In an embodiment, in order to provide each CHA instance 309_1 through 309_M with a full view of the happenings at its local near memory 312_1 for its own cache lines, the hashing functions of the processors 303_1 through 303_M are modified so that cache lines whose system memory addresses map to a same entry in near memory 312_1 will also map to the same CHA instance. Said another way, a correlation is put in place between system memory address, near memory entry and CHA instance. By so doing, a same CHA instance will process all cache requests that pertain to a same entry in near memory 312_1.

With this capability, a CHA instance can detect when a read request has been issued for a cache line having a system memory address that maps to the same near memory entry holding a cache line with a different system memory address having an M/E sibling in the local cache of processor 310_1 where the memory is resident (home processor). That is, a CHA instance can detect when a cache line in near memory 312_1 that is acting "inclusively" is evicted such that the sibling M/E cache line in the processor cache experiences a change in state from having an "inclusive" near memory (copy of itself in near memory) to having an "exclusive" near memory (no copy of itself in near memory). With knowledge of the inclusive/exclusive state of the processor's internally cached M/E cache lines, each CHA instance when issuing a write request for one of its cache lines to controller 305 (e.g., as part of a write back process of a write back memory system) can indicate in the request whether controller 305 can perform the write into near memory 312_1 directly and without first reading near memory 312_1 to confirm there is a cache hit.

As observed in FIG. 3, each CHA instance includes a respective LLC instance 309_1 through 309_N and a snoop filter instance 308_1 through 308_N. Each LLC instance contains the cache lines for its CHA's respective system memory address slice that are cached in the processor's LLC. Each such cache line has state information that identifies which of the cache coherence protocol (e.g., MESI) states the cache line is presently in. The snoop filter contains a table that identifies the MESI state for each of the cache lines having the CHA's respective system memory address that are cached in a caching level higher than the LLC (e.g., L1 and L2 caches). By extending the state information kept for the cache lines that are cached in the LLC and likewise extending the state information kept for the cache lines represented in the snoop filter table to further include additional state information 314_1 through 314_N, 315_1 through 315_N that indicates whether they have an inclusive copy in the local near memory ("inclusive" state) or not ("non inclusive" state), near memory reads can be selectively avoided for writes to system memory for cache lines that are recognized as being in an inclusive state. Likewise, near memory reads can be selectively performed for writes to system memory for cache line writes that are recognized as being in a non exclusive state. The "inclusive/non inclusive" additional information 315_1 through 315_N kept in the cache lines of the LLC instances 302_1 through 302_N and the "inclusive/non inclusive" additional information 314_1 through 314_N kept in the snoop filter instances 308_1 through 308_N may be implemented with a single bit.

Figure 4:
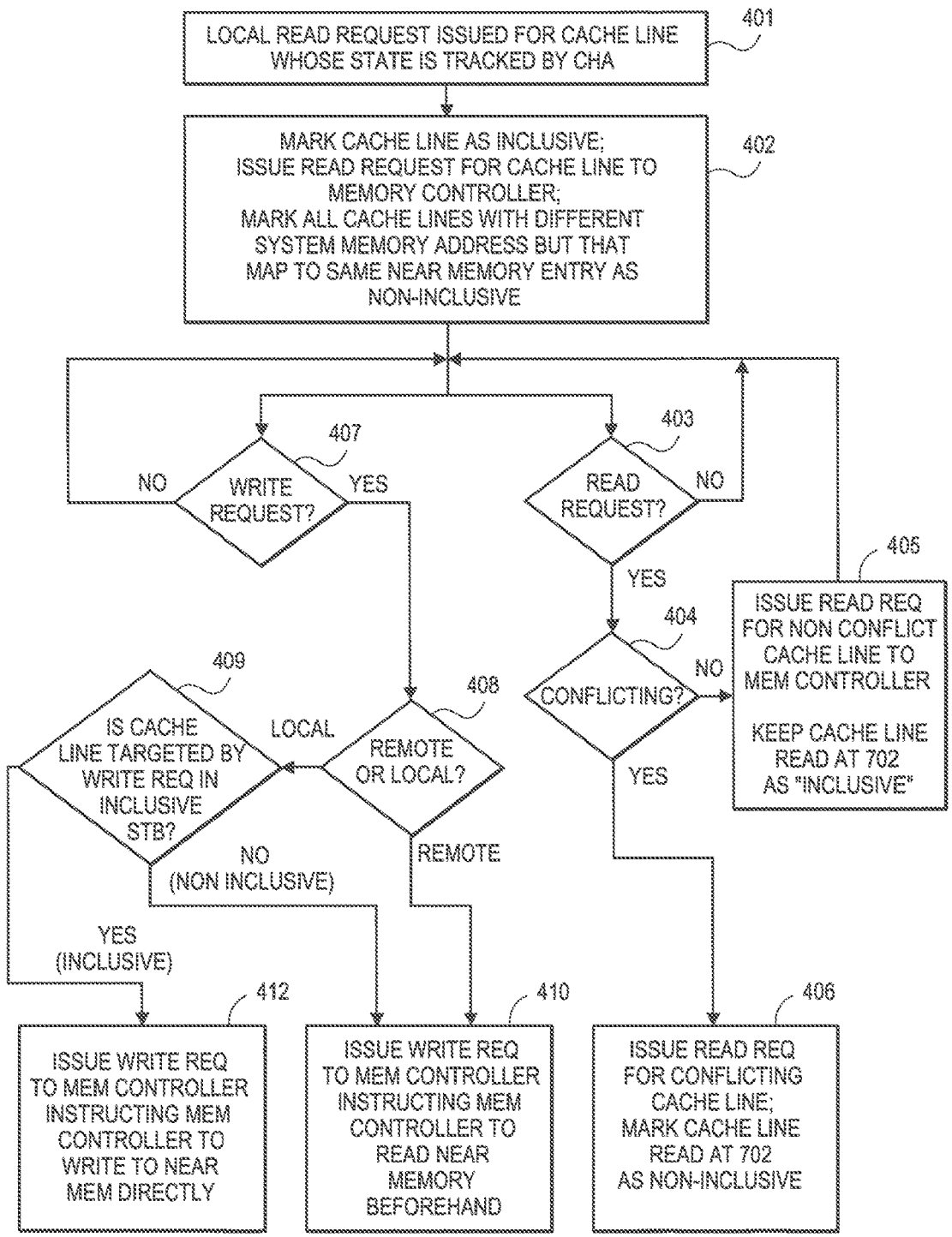
FIG. 4 shows a methodology performed by a CHA of the system of FIG. 3.

FIG. 4 provides a flow diagram that describes how the "inclusive"/"non inclusive" state is tracked for each cache line tracked by a CHA. The flow diagrams hold whether the cache line is cached in the LLC or in a higher level of cache. As observed in FIG. 4, if a CHA recognizes that a locally generated read request is issued 401 to local system memory for one of its cache lines the CHA marks the state of the cache line as "inclusive" and marks the state of any cache lines with different system memory address that map locally to the same near memory entry as "non inclusive" 402. This state transition essentially recognizes that a cache line that is read from system memory will be cached in near memory as part of the system memory read transaction.

As is understood in the art, when a cache line is read from system memory it enters the processor caching system in the E state (if it is not already marked as shared in memory, or if the appropriate action has been taken to invalidate copies in other CPU caches). It may be written to (modified) within a processor cache and change to the M state. So long as no other read requests are issued, whether generated internally on the processor or received externally from a remote processor, for a different system memory address that maps to the same near memory entry that is holding the cache line read at 401, the cache line remains in the inclusive state. Notably, remote requests issued from remote processors that target the processor's local memory are passed before the CHA. Therefore the CHA can detect locally generated as well as remotely generated read requests that would conflict with the cache line read at 402.

If a new read request 403 is received at the CHA but the address of the new read request is non conflicting 404 (i.e., it is the same address as the cache line read at 402 or is a different address but does not map to the same near memory entry as the cache line read at 402), a new read request is generated 405 for the cache line that was read in 402. Here, the memory controller simply performs a standard read which includes an initial read of near memory. In this case, if the address is the same as the cache line read at 402, there will be a cache hit at near memory and the requested cached line is forwarded to the requestor and remains in near memory. If the address is different but does not map to the same near memory entry, the cache line read at 402 will remain in near memory. In either case, the cache line read at 402 remains in near memory and, therefore, the state of the cache line read at 402 is kept in the "inclusive" state. In an embodiment, all read requests perform an initial read of near memory.

Should the CHA detect any new read requests that conflict with the cache line read at 402 (the address of the new read request is different but maps to the same near memory entry as the cache line read at 402), a read request for the new cache line is directed to the memory controller and the state of the cache line read at 402 is changed to non inclusive 406 (because the new read will evict the cache line read at 401 from near memory). If the new conflicting read request was locally generated (generated from the CHA's own processor) the CHA marks the state of the newly read cache line as inclusive. In this case, the process flow for the new cache line can be recognized as having just passed through processes 401 and 402 on its own accord. If the new conflicting read was remotely generated the CHA does not have visibility into this newly read cache line's treatment at the remote processor and therefore does not cache it nor track it. Therefore the CHA does not keep any state for it.

Again, in an embodiment, all read requests to system memory first perform a read of near memory. As such, in the case of a new conflicting read request 403, 404, the cache line initially read at 402 will be read from near memory and evicted to far memory (because the conflicting read request reproduces as a near memory cache miss).

Considering write requests 407, if the CHA becomes aware of any write requests after the initial cache line was read at 402, the CHA first inquires whether the write request was generated remotely or locally 408. If the write request was generated remotely, a write request is issued to the memory controller that instructs the memory controller to perform a read of near memory beforehand 410. If the write request was generated locally and the cache line targeted by the write request (which may or may not be the cache line read at 402) is in the inclusive state 409, the CHA instructs the memory controller to directly write the cache line into near memory without performing a read of near memory beforehand 412. By contrast, if the write request was generated locally and the cache line targeted by the write request (which may or may not be the cache line read at 402) is in the non inclusive state 409, the CHA instructs the memory controller to read near memory before performing the actual write into system memory.

In various implementations the memory controller described above may be implemented with multiple components. For example a "processor-side" portion of the memory controller may exist on the processor and receive requests from the CHA as described above. A "memory side" portion of the memory controller may exist external to the processor (e.g., on a DIMM card on which both near memory and far memory components are placed). This memory side portion may include hit/miss logic circuitry and perform the hit/miss activity associated with near memory reads. In this type of implementation, whether or not a near memory read is to be performed with a write operation is communicated from the CHA to the processor side memory controller, and then from the processor-side of the memory controller to the memory-side of the memory controller. As such, the memory-side component may include logic circuitry to detect whether a write request is indicating if a read of near memory is to performed for the write transaction or if the write operation can be performed directly into near memory without a read of near memory beforehand.

Conceivably, rather than use the inclusive/non inclusive extended state information as discussed at length above, a near memory tag cache can be kept on the processor so that the processor can detect which cache lines are in near memory and issue write requests to the memory controller that skip the near memory read when the processor detects that a version or copy of the cache line targeted by a write request resides within near memory.

It is also pertinent to point out that although FIGS. 2 and 3 emphasized the use of a distributed last level cache and distributed snoop filter instances, a centralized last level caching system and snoop filter function could just as readily employ the teachings of the instant application. Here, a centralized last level caching system may not need to integrate hashing functions into the processing cores that target a specific slice based on address for any outgoing caching activity.

The various features of the CHA and memory controller discussed above may be implemented, e.g., with logic circuitry such as dedicated logic circuits designed into a semiconductor chip. Some or all of the logic circuits may be programmable. The CHA may additionally include state keeping circuits, such as registers and/or memory cells to keep various state information such as the MESI states and inclusive, non inclusive states of the various cache lines. The CHA's functions may also be wholly or partially implemented with program code of some kind. For example, some or all features of the CHA discussed above may be implemented with a microcontroller or other logic circuitry that is designed to execute program code (e.g., firmware). As such various methods described above may be implemented in program code that is stored on a tangible machine readable medium. An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The above description describes a processor that includes: one or more processing cores; a memory controller to interface with a system memory having a near memory and a far memory; a plurality of caching levels above the memory controller; logic circuitry to track state information of a cache line that is cached in one of the caching levels, the state information including a selected one of an inclusive state and a non inclusive state, the inclusive state indicating that a copy or version of the cache line exists in near memory, the non inclusive state indicating that a copy or version of the cache line does not exist in the near memory, the logic circuitry to cause the memory controller to handle a write request that requests a direct write into the near memory without a read of the near memory beforehand if a system memory write request generated within the processor targets the cache line when the cache line is in the inclusive state.

In an embodiment the logic circuitry is part of a cache home agent. In an embodiment the cache home agent includes snoop filter circuitry to track inclusive/non inclusive state information of cache lines cached above a last caching level of the processor. In an embodiment the cache home agent includes a last caching level of the processor. In an embodiment the plurality of caching levels include a distributed last caching level, SF, and CHA. In an embodiment the processing cores include respective hashing functions designed to direct all system memory addresses that map to a same near memory entry to a same last level cache slice. In an embodiment the logic circuitry is to identify when a read request for a cache line having a system memory address that is different than the cache line but that still maps to same near memory entry where a copy or version of the cache line resides, and, if the cache line is in an inclusive state, change the cache line's state to non inclusive in response. In an embodiment the logic circuitry marks all other cached cache lines that map to the near memory entry as non inclusive. In an embodiment the logic circuitry is to cause the memory controller to handle a write request that requests that a read of near memory be performed in response to the processor receiving a remotely generated write request.

The above discussion describes a method including: instructing a memory controller of a processor to read a cache line from a system memory having a near memory component and a far memory component; entering the cache line in a cache of the processor; having an option of choosing one of an inclusive state and a non inclusive state, marking the cache line as having the inclusive state; recognizing that a write request generated on the processor for the cache line has targeted system memory; in response to the combination of the cache line having an inclusive state and the recognizing of the write request, instructing the memory controller to satisfy the write request by performing a direct write into near memory without a read of the near memory beforehand.

In an embodiment the method further includes recognizing that a read request for a second cache line has targeted the system memory, recognizing that the second cache line has a system memory address that is different than the cache line's system memory address, and recognizing that the system memory address of the second cache line maps to a same entry in the near memory where a copy or version of the cache line resides, and changing the state of the cache line to a non inclusive state in response. In an embodiment the method further includes marking the second cache line as having an inclusive state. In an embodiment the method further includes marking all other cache lines that are cached in the processor and have a system memory address that maps to the same entry as having a non inclusive state. In an embodiment the method further includes recognizing that a second read request for the cache line has targeted the system memory, and keeping the state of the cache line inclusive in response. In an embodiment the method further includes receiving a remotely generated write request at the processor and instructing the memory controller to satisfy the remotely generated write request by performing a read of near memory before performing a write into the system memory.

The above discussion describes a computing system including: a) a system memory having a near memory and a far memory; b) a processor, including: one or more processing cores; a memory controller to interface with the system memory; a plurality of caching levels above the memory controller; logic circuitry to track state information of a cache line that is cached in one of the caching levels, the state information including a selected one of an inclusive state and a non inclusive state, the inclusive state indicating that a copy or version of the cache line exists in near memory, the non inclusive state indicating that a copy or version of the cache line does not exist in the near memory, the logic circuitry to cause the memory controller to handle a write request that requests a direct write into the near memory without a read of the near memory beforehand if a system memory write request generated within the processor targets the cache line when the cache line is in the inclusive state.

In an embodiment the plurality of caching levels include a distributed last caching level and wherein the processing cores include respective hashing functions designed to direct all system memory addresses that map to a same near memory entry to a same last level cache slice. In an embodiment the logic circuitry is to identify when a read request for the cache line having a system memory address that is different than the cache line but that still maps to same near memory entry where a copy or version of the cache line resides, and, if the cache line is in an inclusive state, change the cache line's state to non inclusive in response. In an embodiment the logic circuitry marks all other cached cache lines that map to the near memory entry as non inclusive. In an embodiment the logic circuitry is to cause the memory controller to handle a write request that requests that a read of near memory be performed in response to the processor receiving a remotely generated write request.

3.0 Inclusive/Non-Inclusive Tracking with Specially Reserved Cache Slots

As described above, in order to provide for inclusive behavior and/or recognize when inclusive or non-inclusive treatment is appropriate, ideally, all memory requests issued by the processing cores pass through a CHA logic unit so that the CHA logic unit can comprehend the contents of near memory for the system memory address slice that the CHA supports.

Figure 5:
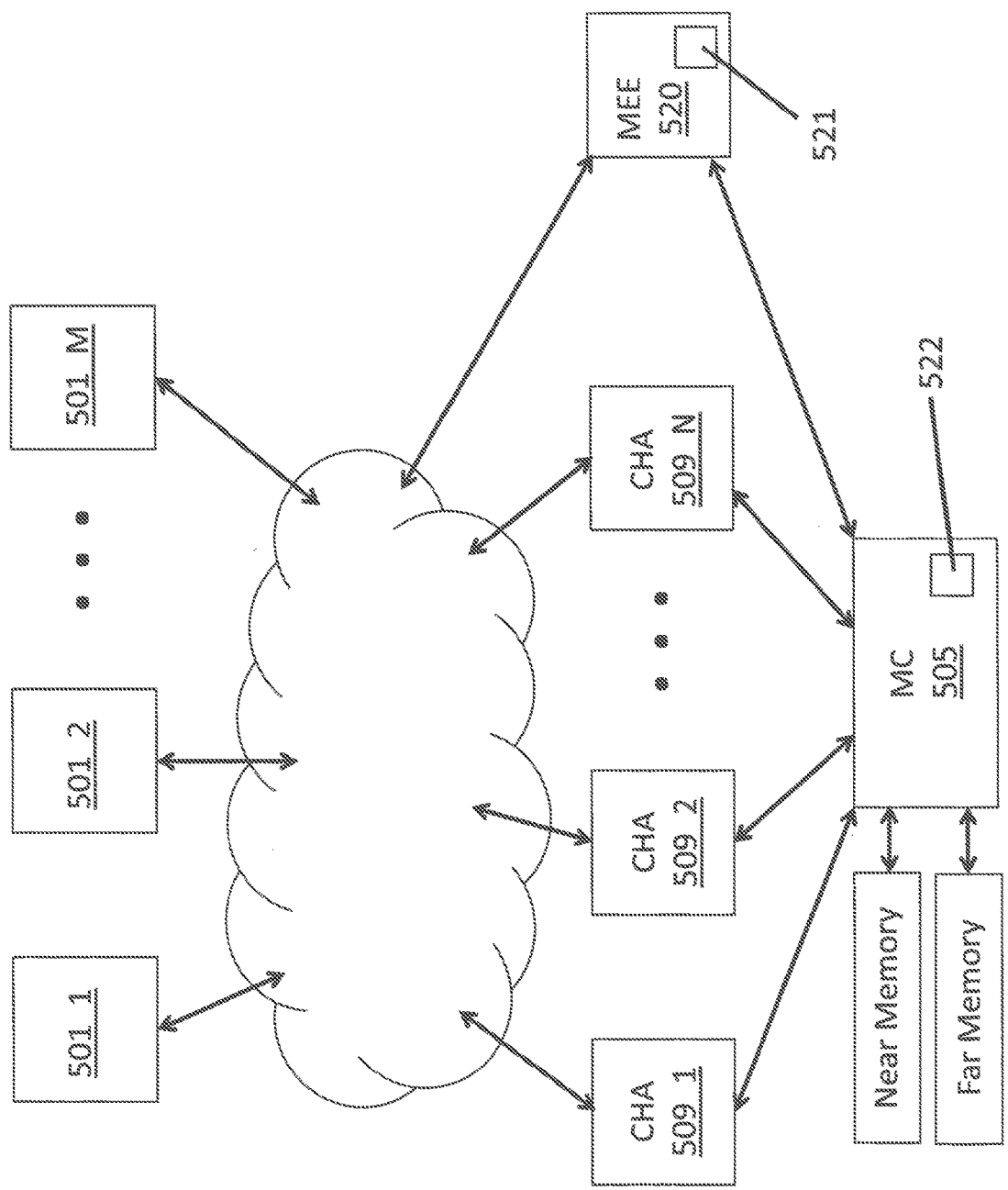
FIG. 5 shows a computing system having a two level system memory and MEE hardware.

As observed in FIG. 5, some systems may choose to implement Memory Encryption Engine (MEE) hardware 520 which is an internal hardware solution for encrypting the data content that is written to system memory and read from system memory. A system that supports MEE typically allocates a range of system memory addresses for encryption protection. When a processing core 501 issues a memory request having a memory address that falls within the special encrypted range, in the case of a write request, MEE hardware 520 encrypts the data and forwards it to the memory controller for writing into system memory.

Additionally, the MEE hardware 520 generates meta-data used to decrypt the encrypted data upon a subsequent read request for the data. The MEE hardware therefore also forwards the meta data to the memory controller 509 which writes the meta-data into a region of system memory that has been specially allocated for the storage of the meta-data. Here, the original memory request may flow through a CHA but the metadata itself may not. For example, a processing core issued request may first be directed to a CHA which, in response to recognizing that the request invokes an encryption/decryption range, routes the request to the MEE hardware 520. The MEE hardware 520 then encrypts the data, creates the meta data and forwards both to the memory controller 509. The metadata that is created by the MEE hardware 520, therefore, does not flow through a CHA (because it is created after a CHA has already processed the request).

As alluded to above, in the case of a read request for data that has been encrypted in system memory, the MEE hardware 520 forwards a read request for both the encrypted data and its associated meta-data to the memory controller 509. In response, the memory controller 509 reads both the encrypted data and the meta data from system memory and forwards them the MEE hardware 520. The MEE hardware 520 processes the encrypted data with the meta-data to decrypt the data. The decrypted data is then forwarded to the processing core that issued the read request.

The creation of metadata by the MEE hardware 520 and its subsequent storage into system memory without passing through a CHA violates the aforementioned requirement for inclusive/non-inclusive treatment in which all system memory traffic flows through a CHA. As such, in an embodiment, the specially allocated system memory addresses that are used to store the MEE meta data are given their own special region of near memory cache that is handled only as non-inclusive. That is, inclusive treatment is not afforded to MEE meta data that is cached in near memory cache (i.e., the memory controller 509 is told or otherwise understands it is to perform a read in near memory cache whenever it receives read or write request for MEE meta data).

Figure 6:
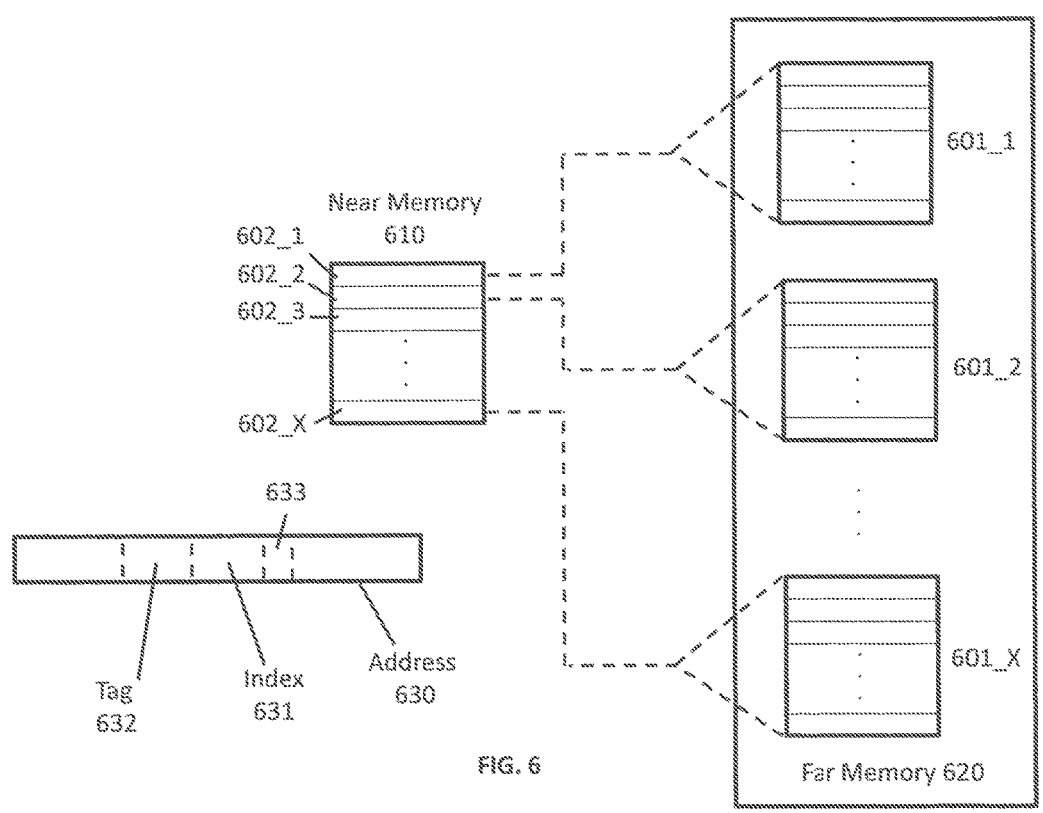
FIG. 6 shows a near memory cache implementation.

In an embodiment, as observed in FIG. 6, the near memory cache 610 is configured as a direct mapped cache. As is understood in the art, a direct mapped cache is designed such that each entry 602_1 through 602_X in the cache 610 is reserved for a unique set of entries 601_1 through 601_X in the deeper storage which in this case is far memory 620. Here, the storage space of far memory 620 can be viewed as being broken down into different system memory address sets 601_1, 601_2, . . . 601_X, where, each set is allocated its own unique entry 602 in near memory cache 610. As such, as observed in FIG. 6, cache entry 602_1 is reserved for any of the system memory addresses associated with set 601_1; cache entry 602_2 is reserved for any of the system memory addresses associated with set 601_2, etc.

FIG. 6 also shows portions 631, 632, 633 of an exemplary system memory address 630. The system memory address 630 may be provided, for instance, from a CPU processing core for a read or write transaction to or from system memory. Here, a group of index bits 631 define which of sets 601_1 through 601_X the system memory address 630 is associated with. Again, each set is understood to have a slot reserved in near memory cache. A group of tag bits 632 define which cache line in the appropriate set the system memory address corresponds to. Lower ordered bits 633 from the index 631 may identify a specific byte within a cache line.

For example, according to one exemplary implementation, the cache line size is 64 bytes and near memory cache 610 is implemented with approximately 1 Gigabyte (GB) of DRAM memory and far memory 620 is implemented with approximately 16 Gigabytes (GB) of non volatile, three dimensional crosspoint memory. Address portions 631, 632 and 633 correspond to 34 bits of address space A[33:0]. Here, lower ordered bits 633 correspond to address bits A[5:0], set address bits 631 correspond to address bits A[29:6] and tag address bits 632 correspond to address bits A[33:30].

From this arrangement, note that the four tag bits 632 specify a value within a range of 1 to 16 which corresponds to the ratio of near memory storage to far memory storage. As such, each entry 602 in cache 610 will map to (i.e., provide cacheable support across) sixteen different far memory 620 addresses. This arrangement essentially defines the size of each set in far memory 620 (16 cache lines per set 601). The number of sets, which corresponds to the number of entries 602 in cache 610, is defined by index bits 631. In this example, index bits 631 corresponds to 24 bits of address space (address bits A[29:6]) which, in turn, corresponds to 16,777,216 cache entries/sets. A 64 byte cache line therefore corresponds to approximately 1 GB of storage within cache 610 (16,777,216×64 bytes=1,073,741,824 bytes).

If the size of the near memory cache 610 were doubled to include 2 GB of DRAM, there would be eight cache lines per set (instead of sixteen) because the near memory capacity to far memory capacity ratio would double to 2:16=1:8. As such the tag 632 would be expressed with three bits (A[33:31]) instead of four bits. The doubling of the DRAM space is further accounted for by providing an additional most significant bit to index bits 631 (i.e., address bits A[30:6] instead of A[29:6]), which, essentially doubles the number of sets.

When a cache line is written into near memory cache 610, the tag portion 632 of its address is included with the cache line data. Misses or hits in near memory cache 610 are then subsequently performed by reading the cache line currently stored in the near memory cache slot that an incoming request's index 631 maps to and comparing the tag value that was stored and returned with the cache line in near memory against the tag value of the incoming request. If they match there is a cache hit. If they do not match there is a cache miss.

In an embodiment, a pair of slots in the near memory cache are specially reserved to hold MEE meta data and the MEE hardware 520 is designed to change the address of a request directed to the MEE meta-data to a new address that is specially directed to one of the reserved slots in the near memory cache. That is, according to nominal operation, the MEE hardware 520 has been informed (e.g, through configuration register space) of the special system memory address space that has been reserved for the keeping of MEE meta data. When a cache line having MEE meta data needs to be created, the MEE hardware 520 constructs or otherwise supports a cache line having a system memory address within the allocated memory space.

However, for near memory caching purposes, the MEE hardware 520 will specially modify this address to ensure that it is cached in a slot of near memory cache that is specially reserved for MEE meta data. FIGS. 7a through 7d show the transformation of an original MEE meta data physical address to a specially crafted address that directs the cache line to a particular cache line slot in near memory.

Figure 7A:
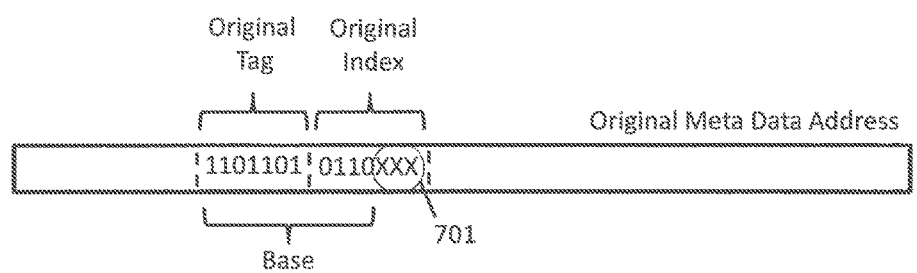
FIGS. 7a through 7d show a process for creating an address that targets a cache slot.

As observed in FIG. 7a, the original meta data physical address can be viewed as having a base address in the tag and index portions that all MEE meta data addresses necessarily include. That is, recalling that a special range of system memory addresses are reserved for the keeping of MEE meta data, the range can be viewed as being defined by a higher ordered base address appended to lower ordered address bits that can vary and determine the size of the range. For instance, for simplicity, FIG. 7a assumes that the computing system has allocated 8 cache lines worth of space in system memory. The eight cache lines are individually specified with 3 bits 701 that are aligned with the least significant bits of the index portion of a system memory address. The aforementioned base address includes the tag portion of the original address and the higher order bits of the index from the three variable bits 701.

Figure 7B:
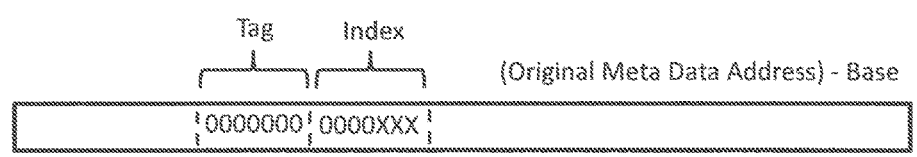
Figure 7C:
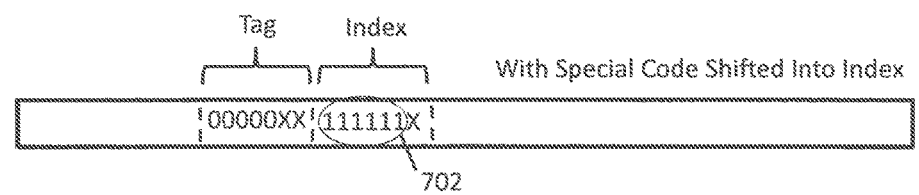

In order to construct a new address from the original address of FIG. 7a that will map to one of the specially reserved cache slots, the MEE hardware, as observed in FIG. 7b, subtracts the base address from the original physical address to effectively pad the tag field and the higher ordered index bits with 0s. Then, as observed in FIG. 7c, a special code 702 is inserted into the higher ordered bits of the index portion of the address that identifies the specially reserved near memory cache slots (the value of the lowest ordered bit (the only "X" in the index portion) determines which one of the slots is being targeted). In the particular embodiment of FIG. 7c, the special code is of the form 1 1 . . . 1. As such, the pair of cache slots identified by the index value 1 1 . . . 1 X are the cache slots that are reserved for MEE meta data.

With the shifting of the special code 702 into the index field, the lowest ordered original bit in the index field remains in place and the inserted code 702 pushes the two higher ordered original bits in the index field "to the left" (towards the highest ordered significant bits) into the tag field. The resulting construction creates a unique tag value for a cache line that will be directed to either of a pair of cache slots identified by index value 1 1 . . . 1 X.

Figure 7D:
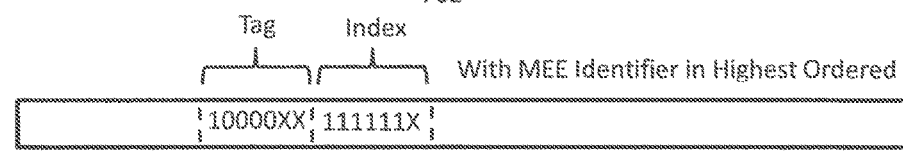
Figure 8A:
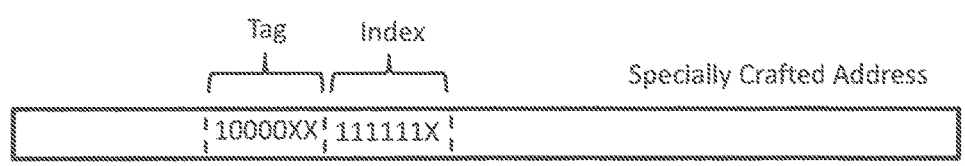
FIGS. 8a through 8d show a process for reconstructing an original address from a specially crafted address.
Figure 8B:
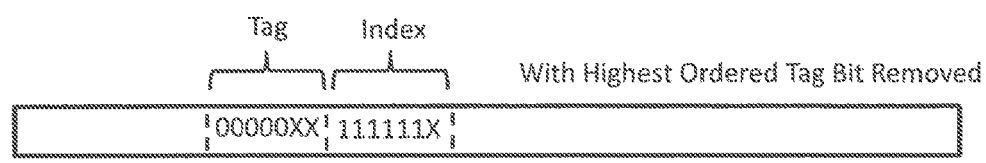
Figure 8C:
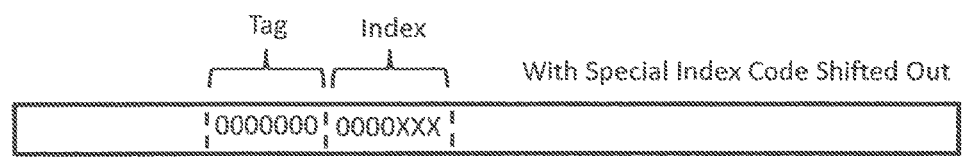
Figure 8D:
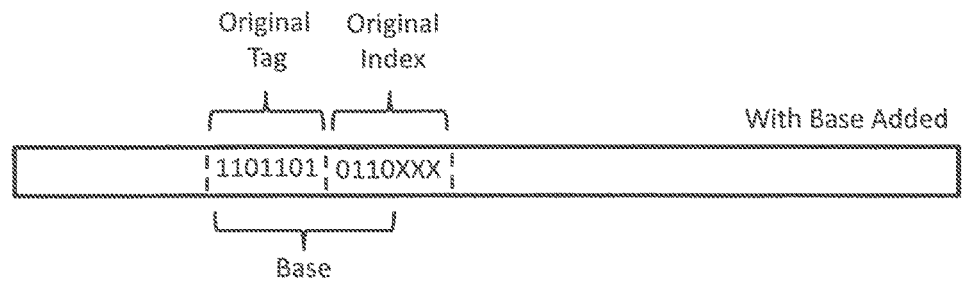

Finally, as observed in FIG. 7d, a "1" is appended to the highest ordered tag bit. As explained in more detail further below, the "1" in the highest ordered bit of the tag field signifies to the memory controller that the address corresponds to an MEE meta data address.

After construction of the specially formed address, the cache line containing the MEE meta data is forwarded to the memory controller. The highest ordered bit in the tag field being set to "1" signifies to the memory controller that the cache line request is coming from the MEE hardware and not a CHA logic unit. With knowledge that the request is coming from the MEE hardware, the memory controller will understand the inclusively does not apply. As such, the request will be handled according to non-inclusive handling principles and a read into near memory will automatically be performed.

Here, the read will be directed to a cache slot identified by index value 1 1 . . . X where X is the lowest ordered bit in the index field of the original physical address of the MEE meta data cache line. If there is near memory cache hit, in the case of a write, the data that was included with the request is written over the cache line in near memory. In the case of a read, the cache line that is read from near memory is forwarded to the MEE hardware. Note that the former (a write) is apt to happen when data is being encrypted before it is stored in system memory and its corresponding meta data is being written into near memory. By contrast the latter (a read) is apt to happen when encrypted data is being read from system memory and its corresponding meta data is read from system memory to decrypt it.

In the case of a cache miss in near memory, various follow-on processes can occur depending on implementation. In one embodiment, the memory controller is configured with the aforementioned base address and is able to reconstruct the original physical address for presentation to far memory.

That is, with knowledge of the base address (e.g., hardwired or via programmed control register space) and the formulation for creating the specially modified address, the memory controller will be able to correctly construct the original address of the request for accessing far memory in response to the near memory miss. After reconstructing the original address in response to the near memory miss, the memory controller will access far memory with the original address. In the case of a write request, the memory controller will write the meta data that was appended with the request into far memory at the original address. In the case of read request, the memory controller will fetch the requested data from far memory using the original address and forward the requested data to the MEE hardware.

The construction of the read response that is forwarded to the MEE hardware may vary from embodiment to embodiment. According to a first embodiment, the read response includes the special address that was used to perform a look-up into the near memory. In this approach the address in the read response is the same as the address in the read request and the MEE hardware only has to compare a response's addresses to the in-flight specially created addresses to know which response corresponds to which request. Internally, the MEE hardware will recreate the original address from the specially created address.

According to another embodiment, the memory controller returns the requested read data with the original address and not the specially crafted one. In this approach, the MEE hardware, after issuing a request with the specially created address, looks for responses that reference the original address that the specially created address was created from rather than the specially created address itself.

Although the above discussion pertaining to the reconstruction of an original address by a memory controller was limited to a miss in near memory, the same reconstruction process may also be performed if a cache line having MEE data is evicted from near memory cache. Here, the tag of the MEE meta data that is kept in near memory with the cache line being evicted will have its upper most bit set to "1" which informs the memory controller that the cache line is an MEE meta data cache line and therefore needs reconstruction of its original address before it can be written back to far memory.

Note that the address transformation scheme is exemplary in terms of its exact particulars. Other embodiments may include the concepts discussed above with respect to FIGS. 7a through 7d but implement them differently. For instance, if four near memory cache slots are to be preserved instead of two, the special code that is inserted into the index can be of the form 1 1 . . . 1 X X (rather than 1 1 . . . 1 X). Additionally the special code can take on any bit pattern and need not be all 1s.

FIG. 8 shows an embodiment of the reconstruction of the original address. As observed in FIG. 8, the recreation process essentially corresponds to the creation process of FIGS. 7a through 7d in reverse. Here, as observed in FIG. 8a, the specially inserted index information is removed from the address and, as observed in FIG. 8b, the lower ordered tag bits that originated from the original index but were pushed into the tag field are pushed back into the index field. As observed in FIG. 8c, the "1" that was appended to the highest ordered bit of the tag field is removed and, as observed in FIG. 8d, the base address is added to the tag field to reconstruct the original address.

It is worthwhile to discuss some of the effects on the overall capacity of the near memory in view of forcing MEE requests to a selected few near memory cache slots as described just above. According to one embodiment, requests that are issued from a CHA unit may also be stored in the near memory cache slots that are used to hold MEE meta-data. That is, there is no internal effort made to block other system memory addresses from having an index that are the same as a specially crafted one. However, to prevent inappropriate mixing of MEE meta data with other information because of the overlap in index address information, system memory addresses that are not associated with the MEE meta data are not permitted to have a highest ordered tag bit equal to 1. That is, all typical non MEE meta data traffic must have a highest ordered tag bit equal to 0.

With this approach there can be no confusion by the memory controller as to which requests correspond to MEE traffic and therefore must be handled non-inclusively and those requests that are coming from a CHA unit and can therefore be handled inclusively or non-inclusively depending on the inclusive/non-inclusive information that is included with the request by the CHA unit. This approach, however, limits the size of the tag field for non MEE traffic and therefore effects the ratio of near memory capacity to far memory capacity. Specifically, the ratio of near memory capacity to far memory capacity is reduced by one half as compared to an approach that does limit the highest ordered tag bit to only one value.

Additionally, in an embodiment, non MEE meta-data traffic originating from a CHA unit is permitted to share the same cache slots that are specially reserved for the MEE meta traffic. Here, as described above, forcing all MEE meta-data traffic to have a highest ordered tag bit of "1" and all non MEE meta-data traffic to have a highest ordered tag bit of "0" prevents an incorrect cache hit between an MEE meta data cache line and another non MEE meta data cache line that otherwise have same near memory address information.

However, because a non MEE meta data cache line could be evicted from a near memory cache slot by an MEE meta data cache line and the CHA unit that processes the system memory address range that the non MEE meta data cache line falls within will not observe the eviction because the MEE meta data cache line did not flow through it, in an embodiment, the specially reserved near memory cache slots are always handled non-inclusively (i.e., a read into near memory must be performed) regardless if the access is for an MEE meta data cache line from the MEE hardware or a non MEE meta data cache line from a CHA logic unit.

Referring back to FIG. 5, note that the MEE hardware 520 includes special electronic circuitry 521 to generate an original address to a special address that targets a particular near memory cache slot, e.g., consistent with the process of FIG. 7. Likewise, the memory controller circuitry 505 also includes special electronic circuitry 522 to convert a specially crafted address back into the original address, e.g., consistent with the process of FIG. 8, in order to access far memory in the case of a miss in cache memory for a request pertaining to MEE meta data, or, an eviction of a MEE data from near memory cache. The special electronic circuits 521, 522 may be implemented as dedicated hardware logic circuitry, programmable logic circuitry, processor/controller circuitry that executes program code or some combination of any of these.

Although embodiments above have been limited to a system in which MEE data flows outside the CHA units, note that the principles discussed above can be more generically applied to any traffic, regardless of its characterization, that does not flow through a CHA unit. For example, private caching resources may be allocated to any thread or process of any of the processing cores 501_1 through 501_M by having accesses of such threads or process not be directed to a CHA unit and instead be subjected to a process that specially crafts their addresses for keeping in specially reserved cache line slots.

4.0 Computing System Embodiments

Figure 9:
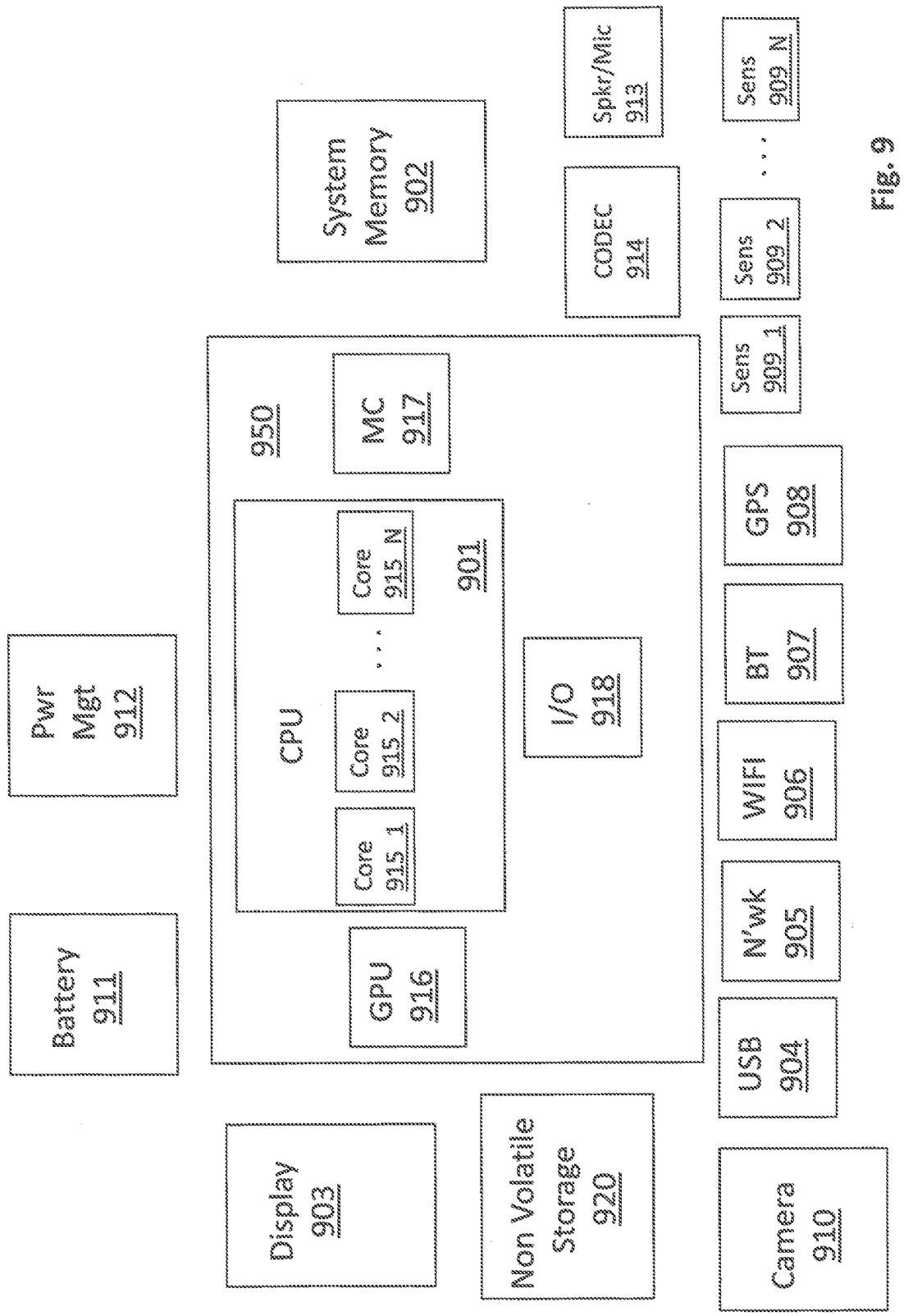
FIG. 9 shows a computing system.

FIG. 9 shows a depiction of an exemplary computing system 900 such as a personal computing system (e.g., desktop or laptop) or a mobile or handheld computing system such as a tablet device or smartphone, or, a larger computing system such as a server computing system. As observed in FIG. 9, the basic computing system may include a central processing unit 901 (which may include, e.g., a plurality of general purpose processing cores and a main memory controller disposed on an applications processor or multi-core processor), system memory 902, a display 903 (e.g., touchscreen, flat-panel), a local wired point-to-point link (e.g., USB) interface 904, various network I/O functions 905 (such as an Ethernet interface and/or cellular modem subsystem), a wireless local area network (e.g., WiFi) interface 906, a wireless point-to-point link (e.g., Bluetooth) interface 907 and a Global Positioning System interface 908, various sensors 909_1 through 909_N (e.g., one or more of a gyroscope, an accelerometer, a magnetometer, a temperature sensor, a pressure sensor, a humidity sensor, etc.), a camera 910, a battery 911, a power management control unit 912, a speaker and microphone 913 and an audio coder/decoder 914.

An applications processor or multi-core processor 950 may include one or more general purpose processing cores 915 within its CPU 901, one or more graphical processing units 916, a memory management function 917 (e.g., a memory controller) and an I/O control function 918. The general purpose processing cores 915 typically execute the operating system and application software of the computing system. The graphics processing units 916 typically execute graphics intensive functions to, e.g., generate graphics information that is presented on the display 903. The memory control function 917 interfaces with the system memory 902. The system memory 902 may be a multi-level system memory such as the multi-level system memory discussed at length above. The system may support non-inclusive/tracking and specially targeted cache slots for traffic that cannot be non-inclusive/inclusive tracked as described above.

Each of the touchscreen display 903, the communication interfaces 904-907, the GPS interface 908, the sensors 909, the camera 910, and the speaker/microphone codec 913, 914 all can be viewed as various forms of I/O (input and/or output) relative to the overall computing system including, where appropriate, an integrated peripheral device as well (e.g., the camera 910). Depending on implementation, various ones of these I/O components may be integrated on the applications processor/multi-core processor 950 or may be located off the die or outside the package of the applications processor/multi-core processor 950.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of software or instruction programmed computer components or custom hardware components, such as application specific integrated circuits (ASIC), programmable logic devices (PLD), digital signal processors (DSP), or field programmable gate array (FPGA).

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A method, comprising:
in a computing system comprising a multi-level system memory where the multi-level system memory comprises a near memory cache, and wherein the computing system directs system memory access requests whose addresses map to a same near memory cache slot to a same home caching agent so that the same home caching agent can characterize individual cache lines as inclusive or non-inclusive before forwarding the requests to a system memory controller, directing other system memory access requests to the system memory controller without passing the other requests through a home caching agent and modifying respective original addresses of the other requests to include a special code that causes the other system memory access requests to map to a specific pre-determined set of slots within the near memory cache.

2. The method of claim 1 wherein the near memory cache is a direct mapped cache and the special code is inserted in an index portion of the other requests' respective addresses.

3. The method of claim 1 wherein the modifying includes inserting information that identifies the other requests as not having passed through a caching home agent.

4. The method of claim 1 wherein the modifying includes inserting the special code into an original address and shifting a bit within the original address whose location is where the special code is inserted to another location within a modified address.

5. The method of claim 4 wherein the bit is located in a tag portion of the modified address after it has been shifted.

6. The method of claim 1 wherein the method further comprises reconstructing an original address of an other request in response to a miss in the near memory cache in order to access a far memory with the reconstructed original address.

7. The method of claim 1 wherein the pre-determined slots are also useable to cache information of system memory access requests that pass through a home caching agent.

8. The method of claim 1 further comprising handling cache lines that are kept in the multi-level system memory according to inclusive/non-inclusive treatment wherein treating of cache lines according to inclusive/non-inclusive treatment further comprises treating cache lines that map to the specific pre-determined slots as being non-inclusive.

9. An apparatus, comprising
electronic circuitry of a computing system comprising a multi-level system memory where the multi-level system memory comprises a near memory cache, and wherein the computing system is to direct system memory access requests whose addresses map to a same near memory cache slot to a same home caching agent so that the same home caching agent can characterize individual cache lines as inclusive or non-inclusive before forwarding the requests to a system memory controller, and where the computing system is to direct other system memory access requests to the system memory controller without passing the other requests through a home caching agent, the electronic circuitry to modify respective original addresses of the other requests to include a special code to cause the other system memory access requests to map to a specific pre-determined set of slots within the near memory cache.

10. The apparatus of claim 9 wherein the near memory cache is a direct mapped cache and the electronic circuitry is to insert the special code into an index portion of the other requests' respective addresses.

11. The apparatus of claim 9 wherein the electronic circuitry is to insert information into the other requests addresses that identifies the other requests as not having passed through a caching home agent.

12. The apparatus of claim 9 wherein the electronic circuitry is to insert the special code into an original address and shift a bit within the original address whose location is where the special code is inserted to another location within a modified address.

13. The apparatus of claim 12 wherein the bit is located in a tag portion of the modified address after it has been shifted.

14. The apparatus of claim 9 wherein the apparatus further comprises other electronic circuitry to reconstruct an original address of an other request in response to a miss in the near memory cache in order to access a far memory with the reconstructed original address.

15. The apparatus of claim 9 wherein the pre-determined slots are also useable to cache information of system memory access requests that pass through a home caching agent.

16. A computing system, comprising:
a plurality of processing cores;
a multi-level system memory comprising a near memory cache;
a networking interface;
a system memory controller coupled to the multi-level system memory;
a plurality of home caching agents, wherein the computing system is to direct system memory access requests whose addresses map to a same near memory cache slot to a same home caching agent so that the same home caching agent can characterize individual cache lines as inclusive or non-inclusive before forwarding the requests to the system memory controller, and where the computing system is to direct other system memory access requests to the system memory controller without passing the other requests through a home caching agent;
electronic circuitry to modify respective original addresses of the other requests to include a special code that causes the other system memory access requests to map to a specific pre-determined set of slots within the near memory cache.

17. The computing system of claim 16 wherein the near memory cache is a direct mapped cache and the electronic circuitry is to insert the special code into an index portion of the other requests' respective addresses.

18. The computing system of claim 16 wherein the electronic circuitry is to insert information into the other requests addresses that identifies the other requests as not having passed through a caching home agent.

19. The computing system of claim 16 wherein the electronic circuitry is to insert the special code into an original address and shift a bit within the original address whose location is where the special code is inserted to another location within a modified address.

20. The computing system of claim 19 wherein the bit is located in a tag portion of the modified address after it has been shifted.

21. The computing system of claim 16 further comprising one or more of:
a networking interface communicatively coupled to one or more of the plurality of processing cores;
a display communicatively coupled to one or more of the plurality of processing cores; or
a battery coupled to one or more of the plurality of processing cores.

* * * * *